(12) United States Patent
Wu et al.

(10) Patent No.: US 8,432,684 B2
(45) Date of Patent: Apr. 30, 2013

(54) COMPUTER ENCLOSURE AND DATA STORAGE DEVICE BRACKET OF THE COMPUTER ENCLOSURE

(75) Inventors: Hung-Yi Wu, New Taipei (TW); Lei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 56 days.

(21) Appl. No.: 13/115,124

(22) Filed: May 25, 2011

(65) Prior Publication Data

US 2012/0287570 A1 Nov. 15, 2012

(30) Foreign Application Priority Data

May 13, 2011 (CN) .......................... 2011 1 0123858

(51) Int. Cl.
*G06F 1/16* (2006.01)
*H05K 5/00* (2006.01)
*H05K 7/00* (2006.01)

(52) U.S. Cl.
USPC .................. 361/679.43; 361/679.41; 361/760

(58) Field of Classification Search .. 361/679.4–679.45, 361/748, 752–754, 760–761
See application file for complete search history.

(56) References Cited

U.S. PATENT DOCUMENTS

| | | | | |
|---|---|---|---|---|
| 4,860,194 A * | 8/1989 | Harrison et al. | ........... | 360/98.01 |
| 5,440,755 A * | 8/1995 | Harwer et al. | ................ | 710/315 |
| 5,986,892 A * | 11/1999 | Hargy, III | ...................... | 361/759 |
| 6,239,979 B1 * | 5/2001 | Ruff | .............................. | 361/759 |
| 6,309,037 B2 * | 10/2001 | Bertolami | .................. | 312/223.2 |
| 6,389,499 B1 * | 5/2002 | Frank et al. | .................... | 710/300 |
| 6,751,694 B2 * | 6/2004 | Liu et al. | ....................... | 710/301 |
| 6,822,877 B2 * | 11/2004 | Chen | ............................. | 361/801 |
| 6,889,280 B1 * | 5/2005 | Barmore | ...................... | 710/301 |
| 6,967,837 B2 * | 11/2005 | Shih | ........................ | 361/679.48 |
| 7,359,216 B2 * | 4/2008 | Hall | ............................. | 361/796 |
| 7,365,994 B2 * | 4/2008 | Sun | .............................. | 361/825 |
| 7,433,198 B2 * | 10/2008 | Fan et al. | ...................... | 361/752 |
| 7,623,343 B2 * | 11/2009 | Chen | ....................... | 361/679.32 |
| 7,742,291 B2 * | 6/2010 | Wu et al. | .................. | 361/679.32 |
| 8,094,446 B2 * | 1/2012 | Liu | ........................ | 361/679.33 |
| 2001/0014927 A1 * | 8/2001 | Chang et al. | .................. | 710/102 |
| 2002/0056018 A1 * | 5/2002 | Schumacher et al. | ........ | 710/300 |
| 2002/0080541 A1 * | 6/2002 | Bunker et al. | ................... | 361/72 |
| 2002/0114145 A1 * | 8/2002 | Ruff | ............................. | 361/801 |
| 2003/0184959 A1 * | 10/2003 | Erickson et al. | .............. | 361/683 |
| 2003/0206404 A1 * | 11/2003 | Ruff | ............................. | 361/759 |
| 2004/0193773 A1 * | 9/2004 | Wang | ............................ | 710/313 |
| 2005/0013112 A1 * | 1/2005 | Lin | ............................... | 361/686 |

(Continued)

*Primary Examiner* — Adrian S Wilson
(74) *Attorney, Agent, or Firm* — Altis Law Group, Inc.

(57) ABSTRACT

A data storage device bracket includes a board, a mounting bracket, a fixing tab, and first and second connectors. The mounting bracket is fixed on the board to receive a data storage device. A number of golden fingers are set on a first side of the board. The fixing tab defines an opening and is fixed on a second side of the board. The first connector is set on the board, adjacent to the mounting bracket and away from the fixing tab. The second connector is set on the board. The first connector is electrically connected to the second connector and the golden fingers. The golden fingers are inserted into a connection slot of a motherboard. The fixing tab is fixed on a rear wall of a shell of a computer enclosure enclosing the motherboard.

7 Claims, 5 Drawing Sheets

U.S. PATENT DOCUMENTS

| | | | |
|---|---|---|---|
| 2005/0276004 A1* | 12/2005 | Hsu et al. .................... | 361/679 |
| 2006/0139870 A1* | 6/2006 | Chen et al. ................... | 361/685 |
| 2006/0156930 A1* | 7/2006 | Xing ............................ | 99/485 |
| 2007/0214299 A1* | 9/2007 | Lo ............................... | 710/301 |
| 2008/0055876 A1* | 3/2008 | Fan et al. ..................... | 361/801 |
| 2008/0160790 A1* | 7/2008 | Orr .............................. | 439/55 |
| 2008/0253076 A1* | 10/2008 | Chen ........................... | 361/684 |
| 2009/0067142 A1* | 3/2009 | Tsai et al. .................... | 361/759 |
| 2009/0073666 A1* | 3/2009 | Tsai et al. .................... | 361/740 |
| 2009/0146030 A1* | 6/2009 | Chen et al. ................... | 248/213.2 |
| 2009/0164685 A1* | 6/2009 | Chen et al. ................... | 710/301 |
| 2012/0026674 A1* | 2/2012 | Aldridge ...................... | 361/679.33 |

* cited by examiner

COMPUTER ENCLOSURE AND DATA STORAGE DEVICE BRACKET OF THE COMPUTER ENCLOSURE

BACKGROUND

1. Technical Field

The present disclosure relates to computer enclosures, and particularly to a computer enclosure with a bracket for installing data storage devices.

2. Description of Related Art

Generally, hard disk drives (HDDs) are mounted on a frame and the frame is then mounted in a computer. However, the frame generally can only be used to mount only one or two HDDs. If more HDDs are desired in the computer, another frame is needed to mount the additional HDDs. However, the computer generally has limited space, and may not have enough room for accommodating another frame. Besides, assembling another frame in the computer involves dismantling the enclosure, which is inconvenient. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of examples and not by limitation. It should be noted that references to "an" or "one" embodiment in this disclosure are not necessarily to the same embodiment, and such references mean at least one.

Figure 4:
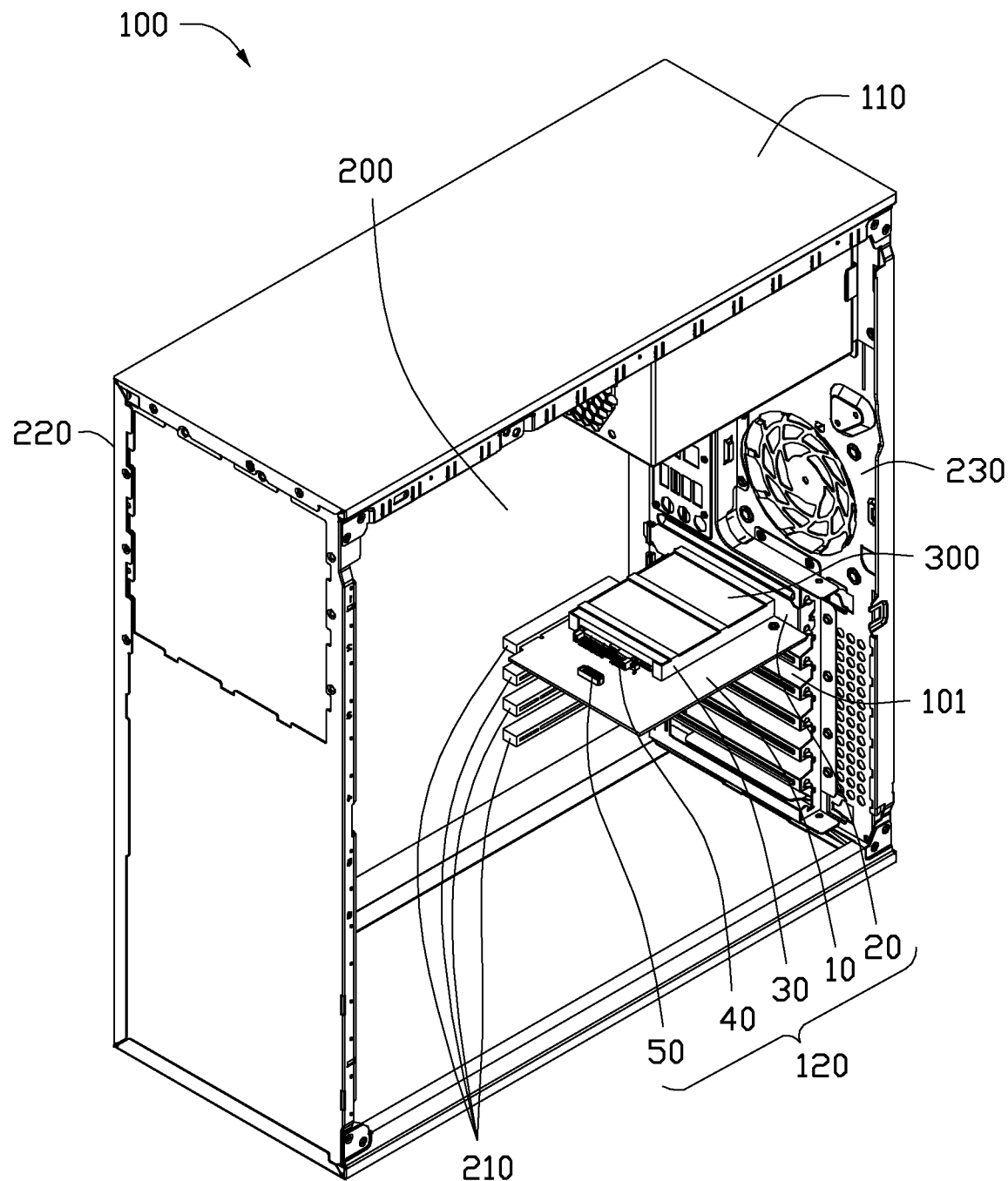
FIGS. 4 and 5 are schematic diagrams of an embodiment of a computer enclosure with the data storage device bracket of FIG. 3, showing different perspectives.

Referring to FIG. 4, a computer enclosure 100 in accordance with an exemplary embodiment includes a shell 110 and a data storage device bracket 120. The shell 110 includes a sidewall 220 for mounting a motherboard 200, and a rear wall 230 perpendicularly extending from a rear end of the sidewall 220. The motherboard 200 includes a plurality of peripheral component interconnection (PCI) slots 210, capable of mounting a plurality of PCI expansion cards (not shown). The rear wall 230 defines a plurality of expansion slots 101 therein, corresponding to the PCI slots 210.

Figure 1:
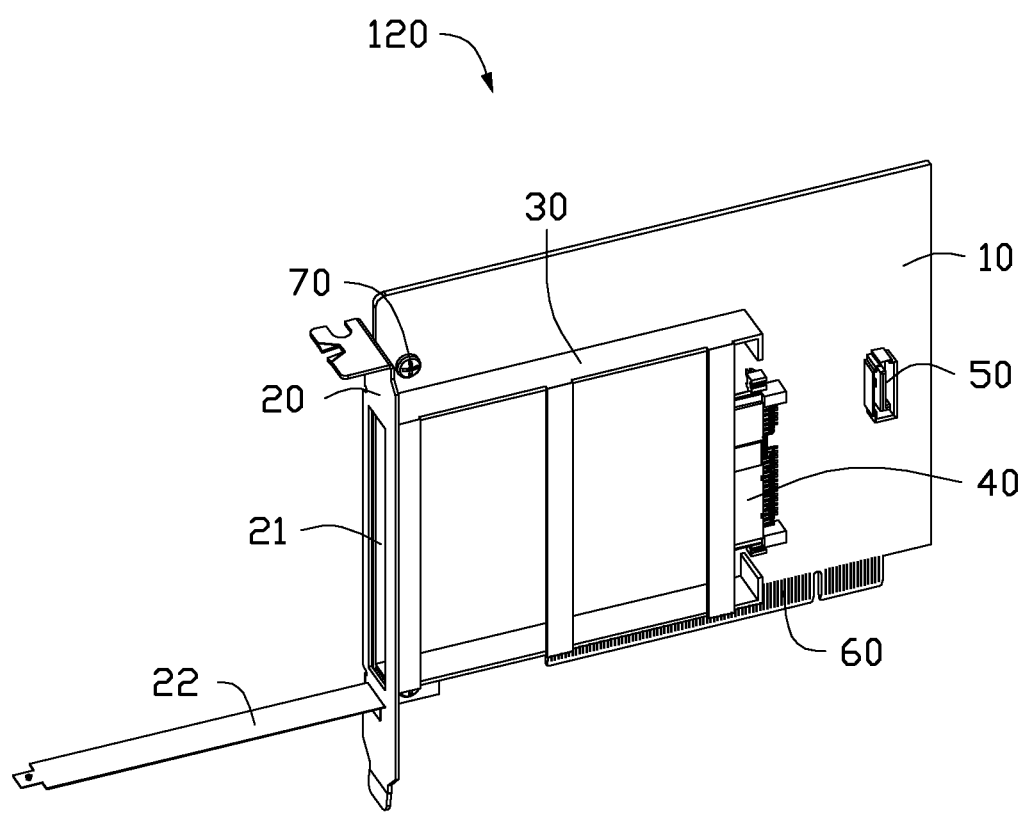
FIGS. 1 and 2 are schematic diagrams of a data storage device bracket in accordance with an exemplary embodiment of the present disclosure.
Figure 2:
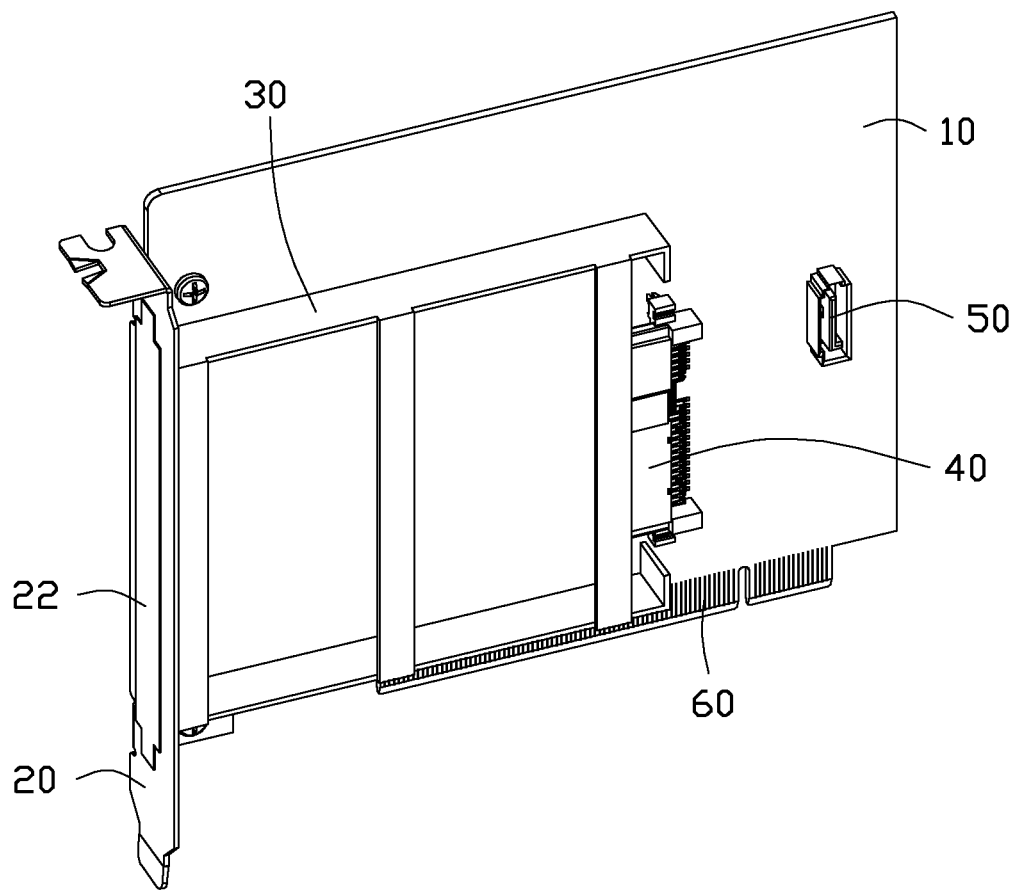
Figure 3:
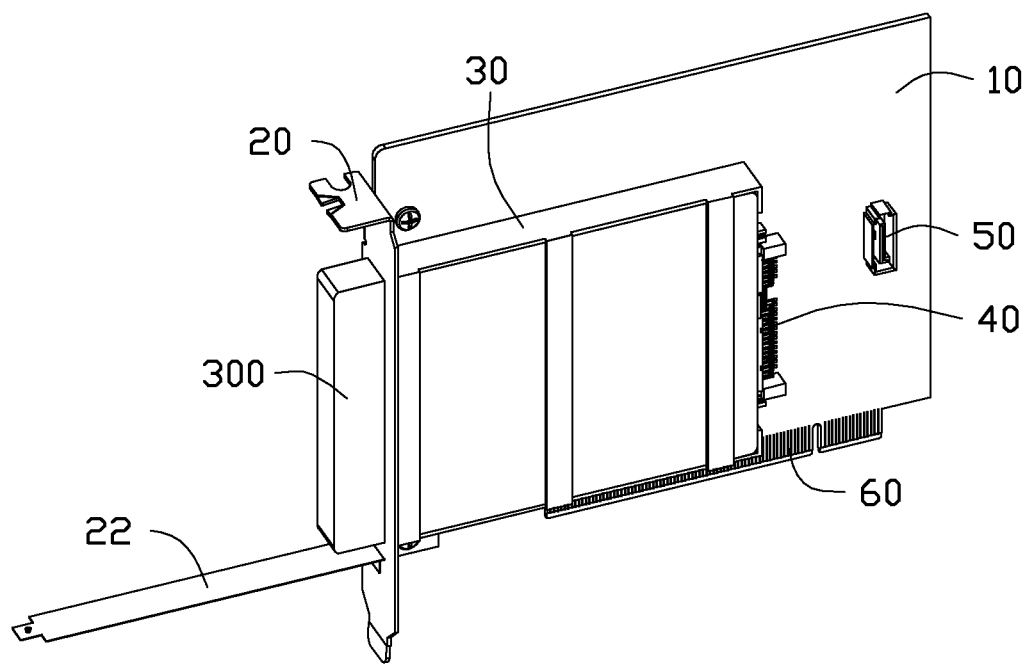
FIG. 3 is similar to FIG. 1, but shows a hard disk drive (HDD) mounted to the data storage device bracket.

Referring to FIGS. 1 to 3, the data storage device bracket 120 includes a board 10, a fixing tab 20, a mounting bracket 30, a first connector 40, and a second connector 50. The board 10 is rectangular. A plurality of golden fingers 60 is set on a bottom side of the board 10 to be inserted into one of the PCI slots 210 of the motherboard 200, thereby electrically connecting the board 10 to the motherboard 200. An opening 21 is defined in the fixing tab 20. A length and a width of the opening 21 are respectively greater than a length and a width of a data storage device, such as a hard disk drive (HDD) 300, thereby allowing the HDD 300 to extend through the opening 21 to enter the mounting bracket 30. A shielding piece 22 covers the opening 21 when no HDD 300 is mounted to the mounting bracket 30, to dustproof the opening. A first end of the shielding piece 22 is rotatably fixed to a bottom end of the fixing tab 20. The fixing tab 20 is fixed to a rear end of the board 10 using screws 70. The mounting bracket 30 is fixed on the board 10 using screws (not shown). In other embodiments, the mounting bracket 30 may be fixed on the board 10 by other means, such as using glue. The first connector 40 is set on the board 10 adjacent to a front end of the mounting bracket 30 and away from the fixing tab 20. The second connector 50 is set on a front end of the board 10 facing the first connector 40. The first connector 40 is electrically connected to the golden fingers 60 and the second connector 50 through conductive lines (not shown) on the board 10. In one embodiment, the first connector 40 is a serial attached small computer system interface (SCSI) (SAS) connector, and the second connector 50 is a serial advanced technology attachment (SATA) connector.

Figure 5:
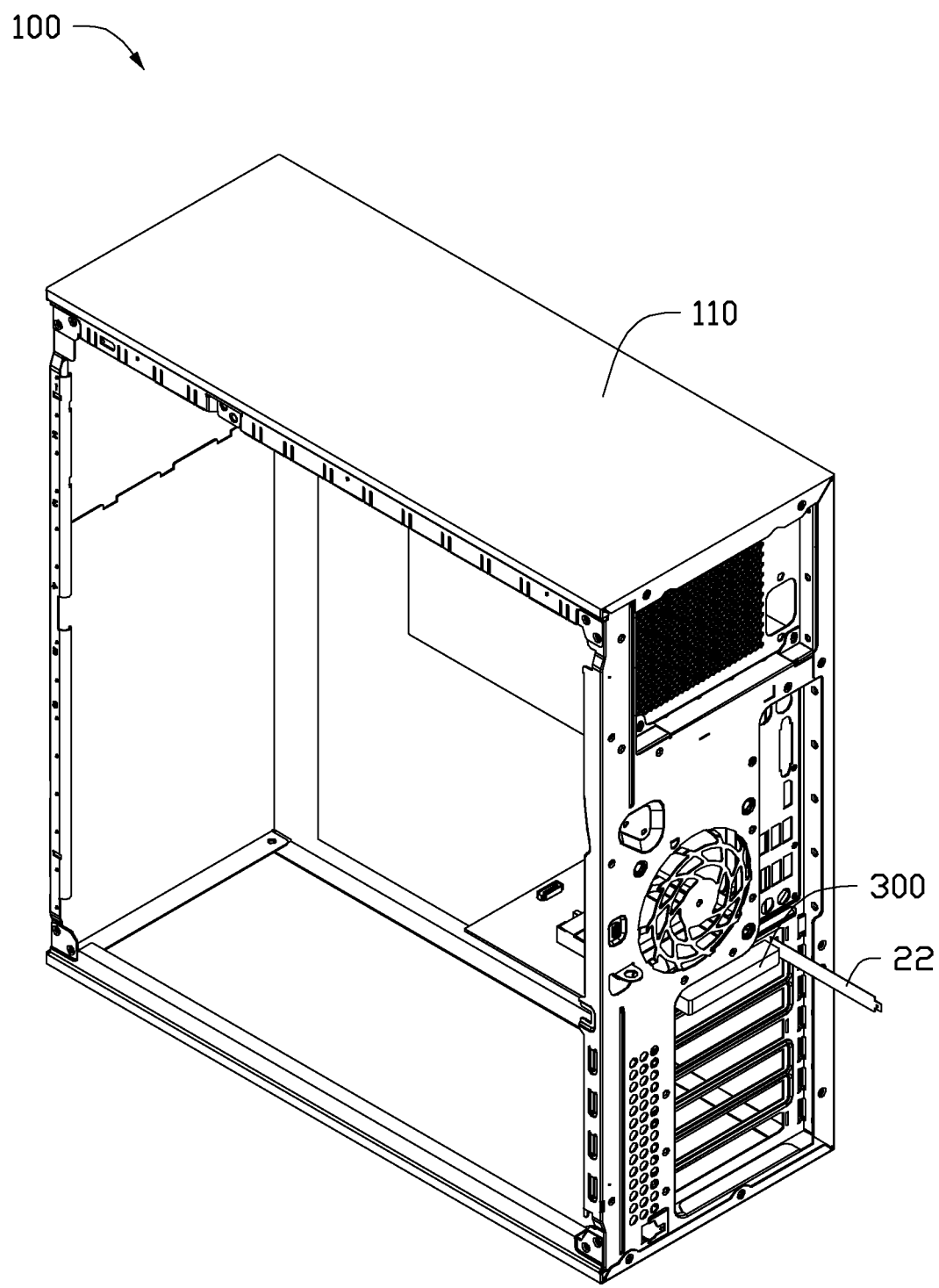

Referring to FIGS. 4 and 5, in assembly, the data storage device bracket 120 is mounted to an idle PCI slot 210 of the motherboard 200 through the golden fingers 60. The fixing tab 20 is fixed to the rear wall 230 of the shell 110 with screws to cover a corresponding expansion slot 101. The second connector 50 is electrically connected to the motherboard 200 by a cable (not shown).

In use, when the HDD 300 needs to be mounted in the computer enclosure 100, the shielding piece 22 of the fixing tab 20 is rotated out, to uncover the opening 21, from an outer side of the rear wall 230. The HDD 300 is extended through the opening 21 of the data storage device bracket 120 from the outer side of the rear wall 230 and is received in the mounting bracket 30. An HDD interface (not shown) of the HDD 300 is electrically connected to the first connector 40. The motherboard 200 provides voltages to the HDD 300 through the PCI slot 210, the golden fingers 60, and the first connector 40. The motherboard 200 outputs data to the HDD 300 through the cable, the second connector 50, and the first connector 40, to communicate with the HDD 300. Therefore, the storage capacity of the computer system is expanded through utilizing the idle PCI slot 210 on the motherboard 200, and furthermore, the HDD 300 can be mounted in the computer enclosure 100 directly, without having to dismantle the enclosure 100, which is very convenient.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:
   a shell comprising a sidewall and a rear wall extending from a rear end of the sidewall, wherein the rear wall defines a plurality of expansion slots;
   a motherboard mounted on the sidewall of the shell, and comprising a plurality of connection slots, corresponding to the plurality of expansion slots; and
   a data storage device bracket comprising:
      a board comprising a plurality of golden fingers set on a side of the board;
      a mounting bracket fixed on the board, to mount a data storage device;

a fixing tab fixed on a rear end of the board, wherein the fixing tab defines an opening therein, through which the data storage device is capable of extending to enter the mounting bracket;

a first connector set on the board, adjacent to a front end of the mounting bracket, and away from the fixing tab, the first connector electrically connected to the golden fingers and to be connected with the data storage device; and a second connector set on the board, facing the first connector, the second connector electrically connected to the first connector;

wherein the golden fingers of the board is inserted into one of the plurality of connection slots of the motherboard, the fixing tab is fixed to the rear wall of the shell to cover a corresponding expansion slot of the rear wall, and wherein the data storage device bracket further comprises a shielding piece, an end of the shielding piece is rotatable fixed to the fixing tab, the shielding piece is mounted to the fixing tab to cover the opening of the fixing tab to dustproof the opening in response to the data storage device being not mounted to the mounting bracket, or uncover the opening of the fixing tab in response to the data storage device being mounted to the mounting bracket.

2. The computer enclosure of claim 1, wherein the plurality of connection slots of the motherboard is peripheral component interconnection (PCI) slots.

3. The computer enclosure of claim 1, wherein the first connector is a serial attached small computer system interface (SCSI) (SAS) connector, and the second connector is a serial advanced technology attachment (SATA) connector.

4. The computer enclosure of claim 1, wherein the board is substantially rectangular, the plurality of golden fingers is set on a bottom side of the board.

5. A data storage device bracket comprising:

a board comprising a plurality of golden fingers set on a first side of the board;

a mounting bracket fixed on the board, to receive a data storage device;

a fixing tab fixed on a second side of the board adjacent to the first side, the fixing tab defining an opening therein, through which the data storage device is capable of extending to enter or exit from the mounting bracket;

a first connector set on the board, adjacent to a front end of the mounting bracket, away from the fixing tab, the first connector electrically connected to the golden fingers and to be connected with the data storage device;

a second connector set on the board, facing the first connector and away from the fixing tab, the second connector electrically connected to the first connector. and a shielding piece, wherein an end of the shielding piece is rotatable fixed to the fixing tab, the shielding piece is mounted to the fixing tab to cover the opening of the fixing tab to dustproof the opening in response to the data storage device being not mounted to the mounting bracket, or uncover the opening of the fixing tab in response to the data storage device being mounted to the mounting bracket.

6. The data storage device bracket of claim 5, wherein the first connector is a serial attached small computer system interface (SCSI) (SAS) connector, and the second connector is a serial advanced technology attachment (SATA) connector.

7. The data storage device bracket of claim 5, wherein the board is substantially rectangular, the plurality of golden fingers is set on a bottom side of the board, and the fixing tab is fixed to a rear end of the board.

* * * * *